UNITED STATES PATENT OFFICE.

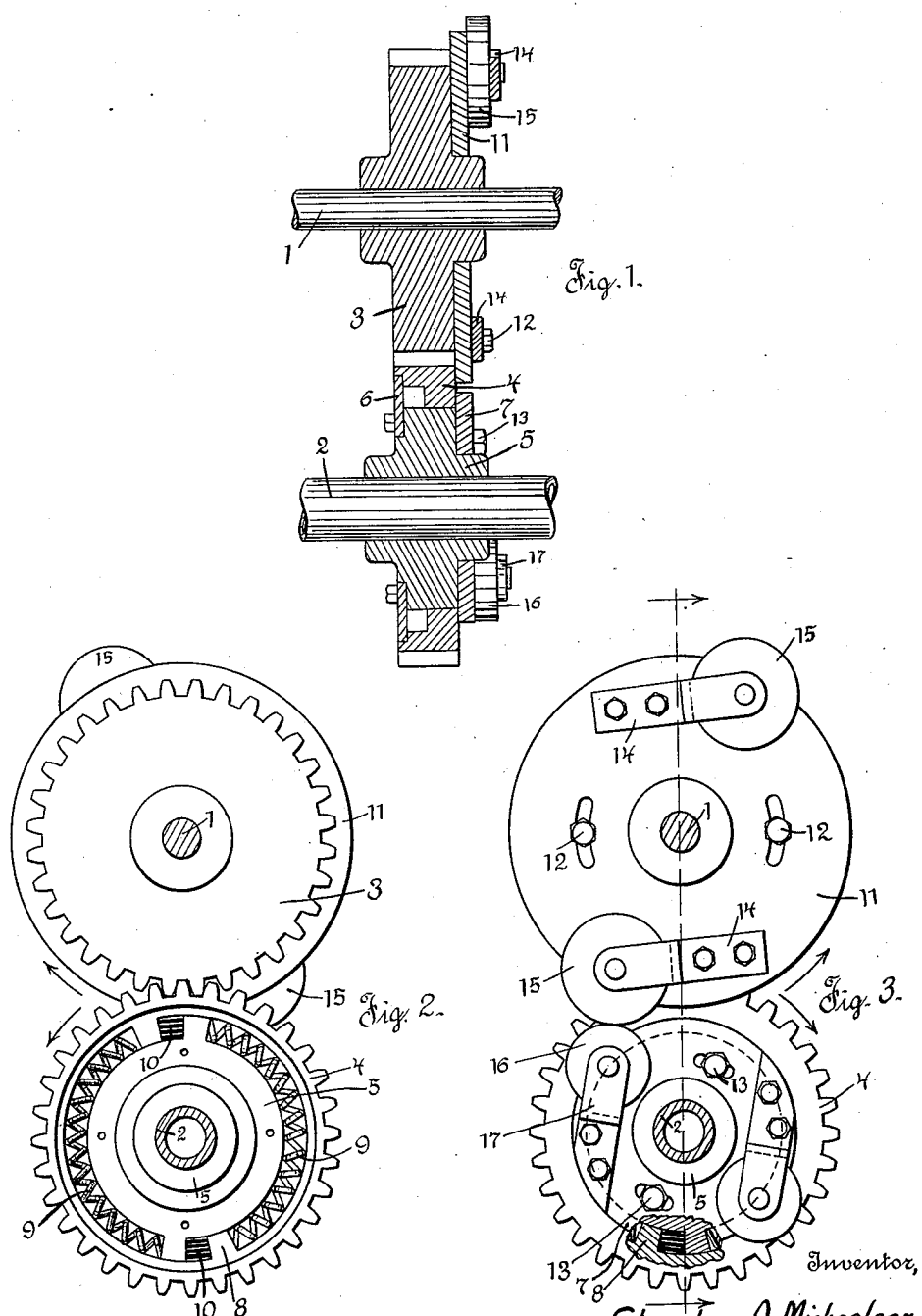

CHARLES O. MICHAELSEN, OF OMAHA, NEBRASKA.

INTERRUPTED-DRIVE GEARING.

1,085,751.      Specification of Letters Patent.      Patented Feb. 3, 1914.

Original application filed May 20, 1911, Serial No. 628,574. Divided and this application filed August 3, 1911. Serial No. 642,216.

*To all whom it may concern:*

Be it known that I, CHARLES O. MICHAELSEN, a citizen of the United States, and a resident of Omaha, in the county of Douglas and State of Nebraska, have invented certain new and useful Improvements in Interrupted-Drive Gearing, of which the following is a specification.

My invention relates to machine elements, and more especially to yieldable gearing.

It is the object of my invention to provide a geared driving mechanism for machines in which an interrupted or periodically retarded rotary movement is desired. Further objects of my invention are to provide means for changing the relations of the interrupting or retarding devices so that the amount of retardation may be varied, and to provide means by which a minor or secondary retardation may be produced in addition to the principal or primary retardation produced by the means first named.

Constructions embodying my invention are illustrated in the accompanying drawings, in which—

Figure 1 is an axial section of the gearing, Fig. 2 is an elevation thereof with the cover-plate of the yieldable gear removed, and Fig. 3 is an elevation of the opposite side of the gears, showing the interrupting rollers.

In the construction shown in the drawings the shafts 1 and 2 are disposed parallel to each other, the shaft 1 being driven at a uniform speed by any suitable means and the shaft 2 being actuated through the driving-gear connection. The gear 3 is mounted fixedly upon the shaft 1 and said gear meshes with the gear 4 which is mounted yieldably on the shaft 2. The gear 4 is in the form of a ring which fits rotatably upon a central body or hub 5 secured to the shaft 2, the gear-ring being retained longitudinally of the shaft by plates 6 and 7 secured on the sides of the hub. On the inner side of the gear-ring are two or more lugs 8 which extend into pockets or recesses in the hub-body, as shown. Each of the lugs 8 is engaged at one side by a coil spring 9 arranged in the recess, and is normally held by said spring in engagement with a block 10 of resilient material such as rubber disposed in the other end of the pocket.

On the side of the gear 3 is a plate 11 which is secured to the gear by screws 12 passing through arcuate slots in the plate, so that the relative positions of the plate and gear may be adjusted. The plate 7 is similarly secured to the hub-body 5 by screws 13. To the plate 11 are secured brackets 14 between the ends of which and the plate are revolubly mounted the rollers 15. Rollers 16 are similarly mounted on the plate 7 between the same and the brackets 17 secured thereto. The rollers 15 and 16 are so disposed with reference to the gears that when the gears are revolved the rollers move in intersecting paths, and the gears are revolved in such direction that the lugs 8 tend to move away from the resilient blocks 10 and to compress the springs 9. The strength of the springs 9 is made such that with a normal resistance to the rotation of the shaft 2 the springs will not be compressed and the shaft will be actuated at the same uniform speed as the driving-shaft 1, as if the driving connection were a simple pair of gears. The rollers 15 and 16 are so arranged, however, with reference to the gears that as the gears revolve the rollers will interfere, each of the rollers 15 passing in front of one of the rollers 16 so as to retard the movement thereof and, consequently, of the hub-body and the shaft 2 with which it is fixedly connected. Such retarding of the movement of the shaft 2 and hub-body relative to the gear 4 is permitted by the compressing of the springs 9 which form a yieldable or compressible driving connection between the gear and the shaft, and as the rollers pass out of engagement with each other the expansion of the springs 9 will accelerate the motion of the shaft until it is restored to its initial relation to the gear 4. When such movement is made with sufficient rapidity the momentum of the parts will also momentarily compress the resilient blocks 10 which, upon the expansion thereof to their normal thickness, will give a second, but shorter, reversing or retarding of the movement of the shaft 3.

The amount and the relative duration of interference of the rollers may be varied by changing the positions of the plates 7 and 11 relative, respectively, to the body 5 and gear 3, such change being permitted by loosening the screws 12 and 13 which pass through the arcuate slots in the plates.

It will be seen that, by the mechanism described, the driving-shaft 1 and the driven shaft 2 will be caused to make the same number of revolutions, but that the uniform rotary movement of the driving-shaft will cause an intermittent, interrupted, or alternately retarded and accelerated rotary movement of the driven shaft. The movement of the driven shaft thus obtained may be employed advantageously in the actuation of rotary screens to secure a shaking, oscillatory or scouring action thereof upon the materials being handled thereby.

Now, having described my invention, what I claim and desire to secure by Letters Patent of the United States is:

1. In a driving gear, a shaft, a recessed hub-body secured thereon, a gear mounted in variable circumferential relation to the hub-body and having portions extending into the recesses thereof, resilient members arranged in said recesses and engaging said portions of the gear to normally hold the same in fixed relation to the hub-body, a second gear meshing with the first and driving the same, and interengaging means on said hub-body and second gear for periodically varying the relation of the hub-body and the first gear.

2. In a driving gear, a shaft, a gear mounted concentrically and in variable circumferential relation thereto, resilient members limiting the circumferential variation of the gear and shaft, means for actuating the gear, and means driven by the gear-actuating means for periodically retarding the movement of the shaft relatively to the gear to place a stress upon the resilient members, and then releasing the shaft to permit said resilient members to restore the relative positions of the shaft and gear.

3. In a driving gear, a shaft, a hub-body fixedly connected therewith, a gear mounted on said hub-body in variable circumferential relation thereto, resilient means yieldably connecting the gear and hub-body, a second gear meshing with and driving the first, a roller adjustably connected with the second gear, and a roller carried by the hub-body, said rollers moving in intersecting paths and being adapted to retard by their periodical interference the movement of the hub-body relatively to the first gear.

4. In a driving gear, a shaft, a hub-body secured to the shaft and having peripheral recesses therein, a gear fitting around said hub-body and rotatable relatively thereto, the gear having lugs extending into the peripheral recesses of the hub-body, means for actuating the gear, interfering means on the hub-body and the actuating means adapted to periodically retard movement of the hub-body, and compressible resilient means disposed in the recesses on both sides of the lugs, the resilient means at one side of each lug having greater compressibility than the means at the other side.

5. In a driving gear, a shaft, a hub-body fixedly secured thereto, a gear mounted upon the hub-body and having portions loosely interengaging therewith, resilient means disposed between said interengaging portions to permit a limited relative rotative movement of the gear and hub-body, a second gear meshing with and driving the first, a roller connected with the second gear, means for adjusting the relation of the roller and said gear, a roller connected with the hub-body, and means for varying the relation of said roller and the hub-body, the roller carried by the gear being adapted to periodically pass in front of the roller carried by the hub-body and retard the movement thereof.

In testimony whereof I have hereunto subscribed my name in the presence of two witnesses.

CHARLES O. MICHAELSEN.

Witnesses:
  D. O. BARNELL,
  CHAS. D. MICHAELSEN.

---

Copies of this patent may be obtained for five cents each, by addressing the "Commissioner of Patents, Washington, D. C."